United States Patent
Frimberger et al.

(10) Patent No.: US 7,017,700 B2
(45) Date of Patent: Mar. 28, 2006

(54) METHOD FOR DETECTING A ROLLOVER SITUATION

(75) Inventors: Manfred Frimberger, Ergoldsbach (DE); Florian Wolf, Regensburg (DE)

(73) Assignee: Siemens Aktiengesellschaft, Munich (DE)

( * ) Notice: Subject to any disclaimer, the term of this patent is extended or adjusted under 35 U.S.C. 154(b) by 34 days.

(21) Appl. No.: 10/220,224

(22) PCT Filed: Jan. 25, 2001

(86) PCT No.: PCT/DE01/00293

§ 371 (c)(1),
(2), (4) Date: Aug. 29, 2002

(87) PCT Pub. No.: WO01/64482

PCT Pub. Date: Sep. 7, 2001

(65) Prior Publication Data

US 2003/0047927 A1 Mar. 13, 2003

(30) Foreign Application Priority Data

Mar. 3, 2000 (DE) ............................... 100 10 633

(51) Int. Cl.
*B62D 49/08* (2006.01)

(52) U.S. Cl. ..................................... 180/282; 280/755

(58) Field of Classification Search ................ 180/282, 180/268; 280/755, 756
See application file for complete search history.

(56) References Cited

U.S. PATENT DOCUMENTS

| | | | |
|---|---|---|---|
| 5,081,587 A | 1/1992 | Okano | |
| 5,262,949 A | 11/1993 | Okano et al. | |
| 5,407,228 A | 4/1995 | Shibata et al. | |
| 6,002,975 A * | 12/1999 | Schiffmann et al. | 701/36 |
| 6,421,592 B1 * | 7/2002 | Bargman et al. | 701/45 |

FOREIGN PATENT DOCUMENTS

| | | |
|---|---|---|
| JP | 2001-071844 | 3/2001 |
| JP | 2002-29352 | 1/2002 |
| WO | WO 97/49571 | 12/1997 |
| WO | WO 99/7962 | 2/1999 |
| WO | WO 99/17963 | 4/1999 |
| WO | WO 97/49578 | 12/1999 |

* cited by examiner

*Primary Examiner*—Eric Culbreth
(74) *Attorney, Agent, or Firm*—Morrison & Foerster LLP

(57) ABSTRACT

The invention relates to a method for detecting a rollover situation in such a way that a restraint, such as belt tighteners or head airbags, can be released at the right time during rollover. The signals that pertain to several sensors and detect transitional and rotational movements are detected, connected to one another and evaluated.

7 Claims, 2 Drawing Sheets

METHOD FOR DETECTING A ROLLOVER SITUATION

CLAIM FOR PRIORITY

This application claims priority to International application No. PCT/DE01/00293 which was published in the German language on Sep. 7, 2001.

TECHNICAL FIELD OF THE INVENTION

The invention relates to a method for detecting a rollover situation.

BACKGROUND OF THE INVENTION

Previous systems only compare the sensor signals provided by the sensors for detecting a rollover situation with a fixed threshold or only set sensor signals from sensors of the same type against one another. A combination of these sensor signals and a comparison with a threshold value is used to decide upon a triggering of the restraint means, which either leads to a high sensitivity of response and corresponding spurious triggerings (misuse) or leads to the triggering decision not being made at the right time.

SUMMARY OF THE INVENTION

In one embodiment of the invention, sensor signals are linked with a threshold value and one another to perform a triggering decision if a sensor signal exceeds the threshold value.

This enables a restraint device, such as belt tensioners or airbags, to be triggered at the right time in the case of a vehicle rollover.

The detection of a rollover situation is carried out in the preferred embodiment by the calculation of suitable terms from the rate of rotation, the lateral and the vertical acceleration of the vehicle. The rate of rotation can be detected by a sensor, which detects the movement and/or the change of movement about one of the longitudinal axes, for example the longitudinal and/or transverse axis of the vehicle. The terms suitable for detecting the rollover situation include the acceleration values of at least one direction and are linked with the rate of rotation term to form a dynamic threshold. This dynamic threshold is compared with a criterion derived from the rate of rotation.

The invention has at least the following advantages:

No spurious triggering in the case of a sensor fault due to a two-out-of-three decision.

Detection of a vehicle rollover before reaching the dynamic toppling threshold of the vehicle;

Evaluation of the rotation and translation of the vehicle;

Detection of the circumstances of rotation and translation typical for a vehicle rollover situation and thus a robust behavior in a misuse situation and in situations in which the vehicle comes close to the dynamic toppling angle;

Estimation of the movement of the occupant in the case of vehicle rollovers which are preceded by a driving situation with a large lateral inclination. If it is detected that, due to a large inclination, the occupant is in the unfolding zone of an airbag (head airbag, curtain), then the airbag will not be activated under any circumstances;

Separate activation of side airbags depending on the direction in which the vehicle rolls over. If further airbags are needed due to rotations >180°, then these are activated as required;

Adaptable to suit different vehicle types (van, SUV, . . .) and different restraint systems (belt tensioners, curtain/head airbags, roll bar) due to the ability to set parameters;

If an acceleration sensor fails, at least some of the possible vehicle rollover scenarios can be detected with the remaining acceleration sensor.

In one aspect, a rate of rotation signal and an acceleration signal are set against a triggering threshold, which is equivalent to mixing of different physical variables.

In another aspect, a dynamic threshold is calculated from the rate of rotation signal and an acceleration signal.

Essentially, two types of rollover accident occur:

In a "tripped rollover", the vehicle skids sideways in the direction of its transverse axis (Y-axis) and rolls over after catching on a lateral obstruction, for example the edge of a curb stone.

In an "untripped rollover", the vehicle travels sideways down an embankment and rolls over on exceeding the lateral toppling angle of the vehicle about its longitudinal axis (X-axis).

Determined by the type of rollover (tripped or untripped), in addition to the rate of rotation signal, the appropriate acceleration signal of the sensors aligned in the direction of the Z-axis or the Y-axis is automatically selected and becomes operative.

Two sensor signals are used to make the triggering decision. The, at least two sensor signals are also used to provide a safing function at the same time. Safing means that a spurious triggering as a result of faulty components, e.g. of a sensor, is prevented. A triggering with only one sensor signal is not possible, which prevents undesired triggering from occurring in the event of a single fault with one sensor.

The two acceleration sensors, Y and Z, which detect accelerations in the direction of the Y-axis and the Z-axis of the vehicle, respectively, are not taken into account together and can also not bring about a triggering decision. The rate of rotation signal of one rate of rotation sensor represents the angular speed, from which the angle of inclination of the vehicle is also formed by integration. The rate of rotation signal alone is not sufficient for the triggering, regardless of the value of this rate of rotation signal or the angle of rotation.

BRIEF DESCRIPTION OF THE DRAWINGS

The invention is explained with reference to the figures. In the drawings.

DETAILED DESCRIPTION OF THE PREFERRED EMBODIMENTS

Figure 1:
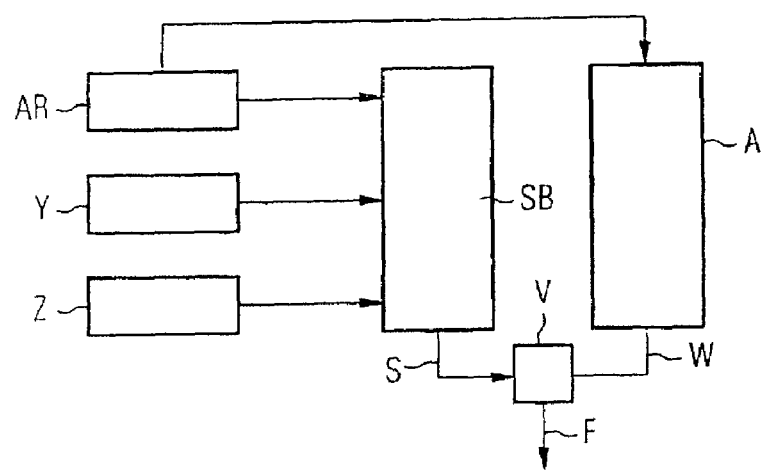
FIG. 1 shows a simplified block circuit diagram for evaluating the sensor signals of a restraint system.

In FIG. 1, sensors Y, Z for the detection of vehicle accelerations in the vehicle transverse axis (Y-direction) and the vertical vehicle axis (Z-direction) and a rate of rotation sensor AR for detecting the speed of rotation of the vehicle about the vehicle longitudinal axis (X-axis) are shown. The signals from the sensors Y, Z, AR are evaluated by a threshold value generator SB, which forms a dynamic rollover threshold S in accordance with a predefined algorithm. A matching element A determines the angular speed W about the vehicle longitudinal axis from the signal of the rate of rotation sensor AR. A comparator V, which can be arranged in an airbag control unit ECU, for example, sends a firing command F to a downstream restraint means when the angular speed W exceeds the rollover threshold S.

The device shown in FIG. 1 is part of an occupant restraint system of a vehicle, for example.

Figure 2A:
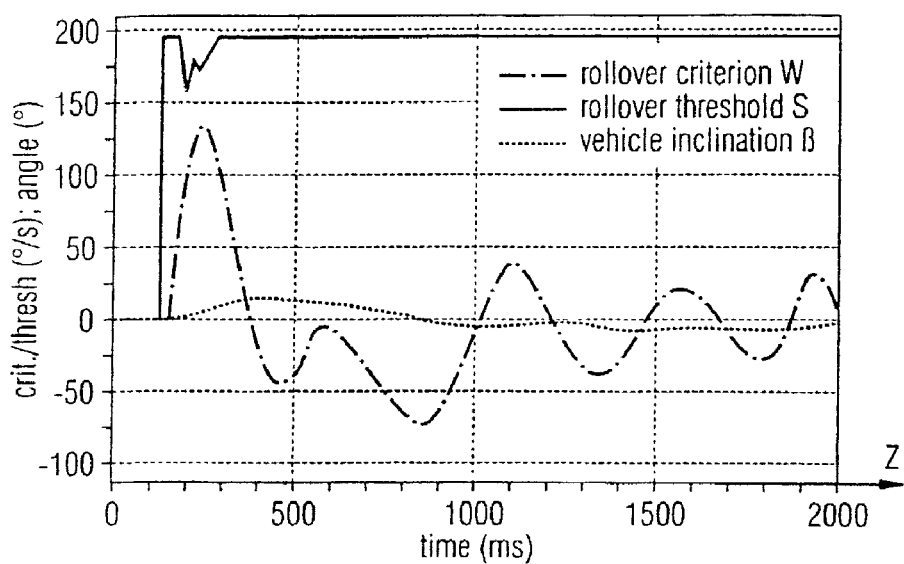
FIG. 2A shows a vehicle situation, represented by the time-related sequence of the sensor signals and the threshold values derived from them, which lead to a decision not to trigger (non-deploy).
Figure 2B:
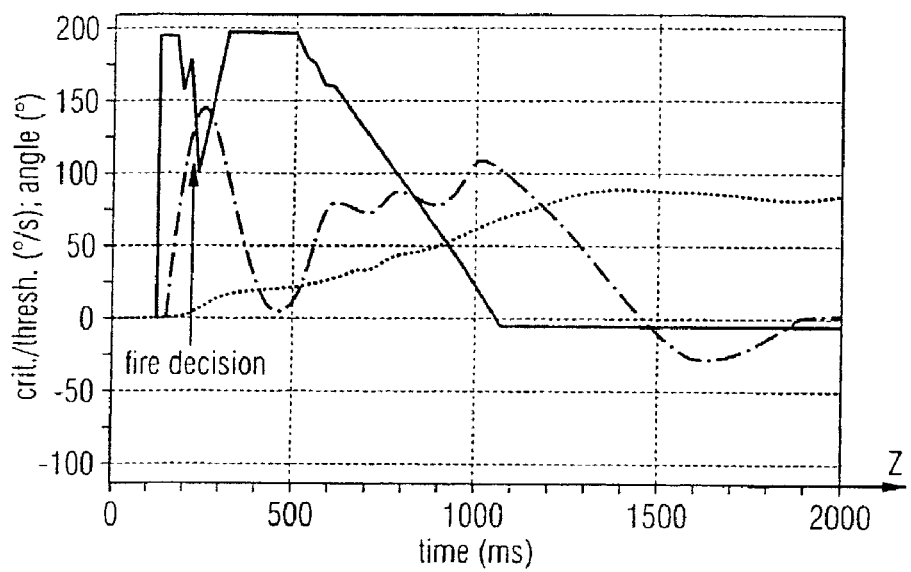
FIG. 2B shows a vehicle situation, represented by the time-related sequence of the sensor signals and the threshold values derived from them, which lead to a decision to trigger (deploy).

Different vehicle situations are shown in FIGS. 2A and 2B:

The vehicle inclination β about the longitudinal axis (X-axis) of the vehicle as a function of the time t is represented by the dotted graph. The units of the vehicle inclination are given in degrees (°).

The angular speed W (rollover criterion) of the vehicle about the longitudinal axis of the vehicle as a function of the time t is represented by the dashed graph. The units of the angular speed W are given in degrees per second (°/s). The angular speed W represents the criterion for the detection of a rollover (rollover criterion W).

The dynamic rollover threshold S (rollover threshold) is calculated from the signals of the acceleration sensors Y, Z in the Y- and Z-direction and of the rate of rotation sensor AR and is represented by the continuous graph. The units of the rollover threshold S are converted to degrees per second (°/s).

The output signal of the rate of rotation sensor AR detects the rotary movements about the X-axis of the vehicle and is preferably filtered by a low-pass filter. The signal present at the output of the low-pass filter represents the angular speed W, which is integrated by means of an integrator in order to obtain the vehicle inclination β.

If the rollover criterion W exceeds the dynamic rollover threshold S (rollover threshold), then a rollover is detected and the restraint device is triggered.

The rollover threshold S is reduced on the occurrence of lateral accelerations in the y-, z-direction and/or rotary accelerations predominantly about the longitudinal axis of the vehicle.

A critical vehicle situation, resulting from a bend being taken too tightly for example, is shown in FIG. 2A, in which the vehicle inclines laterally with high angular acceleration (W max=130°/s) and strongly by about β=20° (t=0 to 400 ms) and then catches itself again, however, after lateral compensatory movements about the longitudinal axis (t<400 ms). The rollover threshold S is reduced during the period 150 to 300 ms, mainly due to the lateral acceleration terms. No significant acceleration occurs in the z-direction. However, as the rollover criterion W does not exceed the threshold S, no restraint system is triggered (non-deploy).

An accident situation is shown in FIG. 2B, in which the vehicle goes into a sideways skid (t=50 ms), begins to incline sideways (t=75 ms) and is then abruptly braked by an unevenness in the highway (t=100 ms), as a result of which the vehicle begins to roll over about the X-axis (t>100 ms). The vehicle comes to rest at an angle of about β=90° (t>1500 ms). The algorithm detected at an early stage (t=100 ms) that the vehicle was being braked so strongly and, at the same time, inclined in the lateral direction that this would lead to a rollover. The decision to fire is reached at the moment in time at which the rollover criterion exceeds the dynamic rollover threshold S.

Due to the strong lateral acceleration in the y-axis, the rollover threshold S reduces for a short time to 100°/s, as a result of which the angular speed w exceeds the rollover threshold S. Consequently, the triggering decision (deploy) is taken.

Furthermore, it can be seen that, from about t=600 ms, changes in the acceleration occur along the z-axis, which lead to a continuous reduction in the rollover threshold (t=600 . . . 1000 ms). If the vehicle were not to come to the lateral position w=90° due to a strong lateral acceleration in the Y-direction but due to traversing an embankment with slow lateral inclination, the restraint means would trigger at about time t=800 ms (intersection of the graphs w-S).

In this way, widely differing accident situations and "only" critical vehicle situations are clearly detected and the restraint means triggered or not at the correct point in time.

Figure 3:
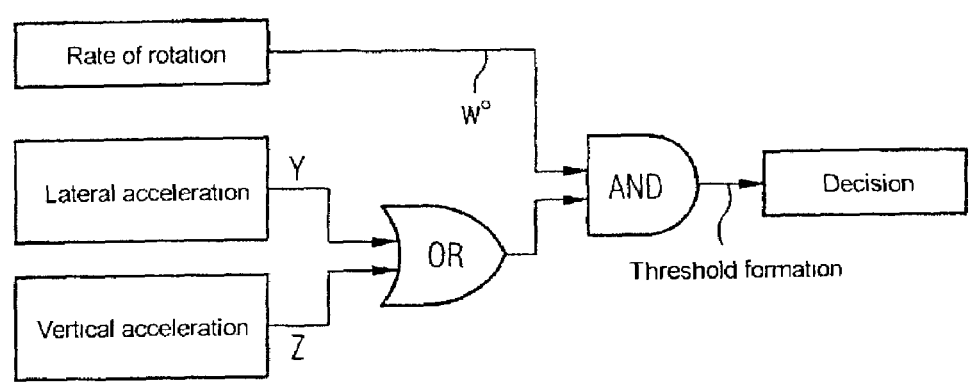
FIG. 3 shows a block circuit diagram of an appropriate safing concept.

A safing concept is shown in FIG. 3, with which the lateral acceleration in the y-axis and the vertical acceleration in the z-axis are ORed together and the result of the OR operation is ANDed with the angular acceleration w of the rate of rotation sensor AR. This ensures that a spurious triggering does not take place in the case of a defective sensor.

The invention claimed is:

1. A method for detecting a rollover, comprising:
   detecting a translatory movement and a rotary movement of the vehicle;
   determining a rollover threshold, wherein the rollover threshold is dependent on a) acceleration of the vehicle in the vertical direction, b) acceleration of the vehicle perpendicular to its longitudinal axis, and c) the rotary movement of the vehicle and
   triggering a restraint device if the rotary movement exceeds the rollover threshold.

2. The method as claimed in claim 1, wherein the rollover threshold depends on the acceleration of the vehicle perpendicular to a vehicle axis.

3. The method as claimed in claim 1, wherein the rollover threshold depends on an angular speed of the vehicle about a longitudinal axis.

4. The method as claimed in claim 1, wherein the rollover threshold depends on the acceleration of the vehicle in a vertical direction.

5. The method as claimed in claim 1, wherein the rollover threshold depends dynamically on at least one of a duration in time of an acceleration of the vehicle perpendicular to a vehicle axis and an angular speed of the vehicle about a longitudinal axis and the acceleration of the vehicle in a vertical direction.

6. The method as claimed in claim 1, wherein a further sensor detects acceleration in a vertical direction.

7. The method as claimed in claim 1, wherein the restraint device triggers when at least one acceleration signal and at least one rate of rotation signal is present.

* * * * *